US007685240B2

(12) United States Patent
Tonegawa et al.

(10) Patent No.: US 7,685,240 B2
(45) Date of Patent: Mar. 23, 2010

(54) E-MAIL COMMUNICATION APPARATUS, E-MAIL COMMUNICATION METHOD AND PROGRAM

(75) Inventors: Nobuyuki Tonegawa, Kawasaki (JP); Kaori Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 11/365,595

(22) Filed: Mar. 2, 2006

(65) Prior Publication Data
US 2006/0212527 A1 Sep. 21, 2006

(30) Foreign Application Priority Data
Mar. 15, 2005 (JP) .............................. 2005-073960

(51) Int. Cl.
*G06F 15/16* (2006.01)
*H04J 3/22* (2006.01)
(52) U.S. Cl. ........................ 709/206; 709/236; 370/471
(58) Field of Classification Search ................. 709/206, 709/207, 247, 236; 707/101, E17.002; 715/251, 715/277; 714/E11.187; 370/470, 471, 473
See application file for complete search history.

(56) References Cited

U.S. PATENT DOCUMENTS

| 5,390,247 | A  | 2/1995  | Fischer |
|-----------|-----|---------|---------|
| 6,101,548 | A  | 8/2000  | Okada |
| 6,219,150 | B1 | 4/2001  | Eguchi |
| 6,311,210 | B1 | 10/2001 | Foladare |
| 6,493,105 | B1 | 12/2002 | Onuma ...................... 358/1.15 |
| 7,023,974 | B1* | 4/2006 | Brannam et al. ......... 379/93.24 |
| 7,111,046 | B2 | 9/2006  | Watanabe |
| 2001/0040694 | A1 | 11/2001 | Eguchi |

(Continued)

FOREIGN PATENT DOCUMENTS

CN          1398476          2/2003

(Continued)

OTHER PUBLICATIONS

Fajman, R., An Extensible Message Format for Message Disposition Notifications, Mar. 1998, IETF, RFC2298, http://tools.ietf.org/html/rfc2298.*

(Continued)

*Primary Examiner*—Quang N. Nguyen
*Assistant Examiner*—Nam Thai
(74) *Attorney, Agent, or Firm*—Fitzpatrick, Cella, Harper & Scinto

(57) ABSTRACT

To provide an e-mail communication apparatus, an e-mail communication method and a program capable of, in the case of receiving e-mail which is split e-mails including request-to-send (RTS) information for transmitting the e-mail to a predetermined destination, suitably performing transmittal confirmation without transmitting to a source the e-mail of the transmittal confirmation as to each of multiple pieces of the split e-mails. First, an MFP 100 having received the e-mail determines whether or not the e-mail is one of multiple divided data pieces generated by dividing image data by a data amount so as to store it. In the case where the received data is the divided data, the MFP 100 determines whether or not all the divided data pieces of the image data are stored, and transmits transmittal confirmation mail based on an MDN request if all are stored.

11 Claims, 13 Drawing Sheets

U.S. PATENT DOCUMENTS

| | | | |
|---|---|---|---|
| 2003/0018731 A1* | 1/2003 | Watanabe et al. | 709/207 |
| 2003/0189733 A1 | 10/2003 | Kim | |
| 2003/0233421 A1 | 12/2003 | Shibata | |
| 2005/0071500 A1 | 3/2005 | Tonegawa | |
| 2005/0219076 A1* | 10/2005 | Harris | 341/51 |
| 2006/0192990 A1 | 8/2006 | Tonegawa | |
| 2006/0200529 A1 | 9/2006 | Tonegawa | |
| 2006/0212527 A1 | 9/2006 | Tonegawa | |
| 2006/0212528 A1 | 9/2006 | Tonegawa | |

FOREIGN PATENT DOCUMENTS

| | | | |
|---|---|---|---|
| CN | 1476230 | | 4/2009 |
| JP | 2000-032202 | | 1/2000 |
| JP | 2000-259513 | | 9/2000 |
| JP | 2001-134505 | | 5/2001 |
| JP | 2001-236275 | | 8/2001 |
| JP | 2002-185686 | | 6/2002 |
| JP | 2002-324035 | | 11/2002 |
| JP | 2003-046702 | | 2/2003 |
| JP | 2003-333098 | | 11/2003 |
| JP | 2004-023121 | | 1/2004 |
| JP | 2004-236005 | | 8/2004 |
| JP | 2004236005 A | * | 8/2004 |
| JP | 2004-252619 | | 9/2004 |
| JP | 2004-312111 | | 11/2004 |
| JP | 2005-057494 | | 3/2005 |
| KR | 1998-087167 | | 12/1998 |
| KR | 1998-087168 | | 12/1998 |
| KR | 1999-007212 | | 1/1999 |
| KR | 2002-0073540 | | 9/2002 |
| KR | 2003-0079283 | | 10/2003 |
| WO | 02/47337 | | 6/2002 |

OTHER PUBLICATIONS

Korean Office Action dated Feb. 28, 2008 issued during prosecution of related Korean application No. 10-2006-0023880.
RFC 2045, "Multipurpose Internet Mail Extensions (MIME) Part One: Format of Internet Message Bodies", Nov. 1996.
RFC 2046. "Multipurpose Internet Mail Extensions (MIME) Part Two: Media Types", Nov. 1996.
RFC 2298, "An Extensible Message Format for Message Disposition Notifications", Mar. 1998.
U.S. Appl. No. 10/503,221, filed Aug. 2, 2004.
U.S. Appl. No. 10/585,090, filed Jun. 30, 2006.
Korean Office Action dated Jun. 18, 2007, with its English language translation for corresponding Korean Patent Application No. 2006-23880.
Sakaki, M., "Anti-Practical Network Seminar", Linux Magazine, vol. 7, No. 2, pp. 133-139, Feb. 1, 2005, Japan ASCII Corporation. (Whole English-language translation included).
Chinese Office Action dated Feb. 13, 2009 issued during prosecution of related Chinese application No. 20060059217.5.

* cited by examiner

FIG. 5

```
1ST LINE    X-Priority: 1(Highest)
2ND LINE    Date: Wed, 31 Dec 2003 17:17:14 +0900
3RD LINE    From: <ifax@copy1.xyz.co.jp>
4TH LINE    Subject: ?ISO-2022-JP?B?WzEvNV0bJE17cU5BQXdJVRsoQg==?=
5TH LINE    To: =?ISO-2022-JP?B?GyRCIUozdCFLGyhCQUJD?= <ifax@abc.co.jp>
6TH LINE    Cc: =?ISO-2022-JP?B?GyRCMUQ2SBsoQjMbJElyXRsoQg==?= <ifax@copy2.xyz.co.jp>,
7TH LINE        =?ISO-2022-JP?B?GyRCMUQ2SBsoQjlbJElyXRsoQg==?= <ifax@copy3.xyz.co.jp>
8TH LINE    Bcc: =?ISO-2022-JP?B?GyRCMUQ2SBsoQjMbJElyXRsoQg==?= <ifax@copy1.xyz.co.jp>
9TH LINE    Message-Id: 20031231133647.TxNo.0580.01@copy3.xyz.co.jp
10TH LINE   Disposition-Notification-To: ifax@copy1.xyz.co.jp
11TH LINE   Mime-Version: 1.0
12TH LINE   Content-Type: message/partial; number=1; total=5;
13TH LINE   id="20041110104508.0000.TxNo.0105@copy3.xyz.co.jp"
14TH LINE
15TH LINE   Priority: 1 (Highest)
16TH LINE   Date: Wed, 31 Dec 2003 17:17:14 +0900
17TH LINE   From: <ifax@copy1.xyz.co.jp>
18TH LINE   Subject: ?ISO-2022-JP?B?GyRCO3FOQUF3SVUbKEI=?=
19TH LINE   To: =?ISO-2022-JP?B?GyRCIUozdCFLGyhCQUJD?= <ifax@abc.co.jp>
20TH LINE   Cc: =?ISO-2022-JP?B?GyRCMUQ2SBsoQjMbJElyXRsoQg==?= <ifax@copy2.xyz.co.jp>,
21ST LINE       =?ISO-2022-JP?B?GyRCMUQ2SBsoQjlbJElyXRsoQg==?= <ifax@copy3.xyz.co.jp>
22ND LINE   Bcc: =?ISO-2022-JP?B?GyRCMUQ2SBsoQjMbJElyXRsoQg==?= <ifax@copy1.xyz.co.jp>
23RD LINE   Message-Id: 20031231133647.TxNo.0580.01@copy3.xyz.co.jp
24TH LINE   Mime-Version: 1.0
25TH LINE   Content-Type: multipart/mixed; boundary="AHMOALBJDADADADCDADAAAAOB"
26TH LINE
27TH LINE   --AHMOALBJDADADADCDADAAAAOB
28TH LINE   Content-Type: text/plain; charset="ISO-2022-JP"
29TH LINE
30TH LINE   · $B$*@$OC$K$J$C$F$*$j$ ˜ $9!# · (B
31ST LINE   · $B$40MMj$N;qNA$rAw$j$ ˜ $9!# · (B
32ND LINE
33RD LINE   --AHMOALBJDADADADCDADAAAAOB
34TH LINE   Content-Type: image/tiff; name="Image.tif";
35TH LINE   Content-Transfer-Encoding: base64
36TH LINE   Content-Disposition: attachment; filename="Image.tif"
37TH LINE
38TH LINE   SUkqAAgAAAARAP4ABAABAAAAAgAAAAABAwABAAAAwAYAAAEBAwABAAAAgAgAAAIBAwABAAAAAQAA
39TH LINE   AAMBAwABAAAAAwAAAAYBAwABAAAAAAAAAAoBAwABAAAAgAAABEBBAABAAAA6gAAABIBAwABAAAA
40TH LINE   AQAAABUBAwABAAAAAQAAABYBBAABAAAAgAgAABcBBAABAAAAAFIAAABoBBQABAAAA2gAAABsBBQAB
41ST LINE       ...
42ND LINE       ...
43RD LINE       ...
44TH LINE   eHlv+V8Uu/s0b4ri6KLe8wdXdfF1bntmEABonuluxl/nQPtBlt/ROCLqoiVRH3tzo1OUd8rHfueu
```

FIG. 8

DIVISION LIST
650 — DIVISION ID : 20041110104508.0000.TxNo.0105@copy3.xyz.co.jp
651 — ADDRESS : ifax@abc.co.jp

| | SUBJECT | DIVISION NUMBER | DATA SIZE | RECEPTION TIME |
|---|---|---|---|---|
| 1 | [1/5] DATA SENDING | 1/5 | 2.97 MByte | 2003/12/31 17:17 |
| 2 | [2/5] DATA SENDING | 2/5 | 2.97 MByte | 2003/12/31 17:17 |
| 3 | [5/5] DATA SENDING | 5/5 | 1.03 MByte | 2003/12/31 17:18 |
| 4 | | | | |
| 5 | | | | |
| 6 | | | | |

652  653  654  655

◁ 656
▷ 657

RETURN — 658

660  661  662

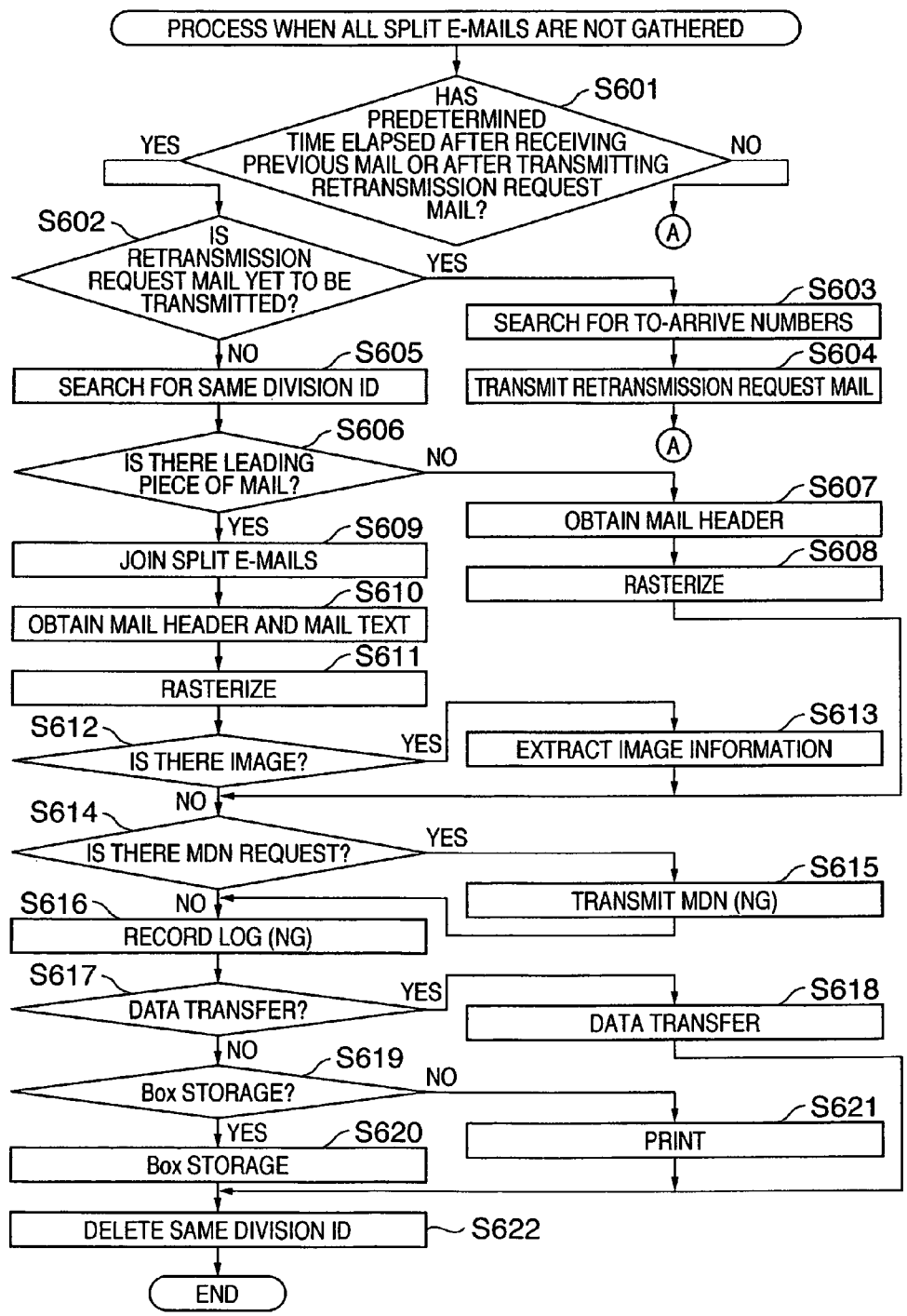

FIG. 12

```
1ST LINE   X-Priority: 1(Highest)
2ND LINE   Date: Wed, 31 Dec 2003 17:17:14 +0900
3RD LINE   From: <ifax@copy1.xyz.co.jp>
4TH LINE   Subject: ?ISO-2022-JP?B?WzEvNV0bJE17cU5BQXdJVRsoQg==?=
5TH LINE   To: =?ISO-2022-JP?B?GyRCIUozdCFLGyhCQUJD?= <ifax@abc.co.jp>
6TH LINE   Cc: =?ISO-2022-JP?B?GyRCMUQ2SBsoQjMbJElyXRsoQg==?= <ifax@copy2.xyz.co.jp>,
7TH LINE      =?ISO-2022-JP?B?GyRCMUQ2SBsoQjlbJElyXRsoQg==?= <ifax@copy3.xyz.co.jp>
8TH LINE   Bcc: =?ISO-2022-JP?B?GyRCMUQ2SBsoQjMbJElyXRsoQg==?= <ifax@copy1.xyz.co.jp>
9TH LINE   Message-Id: <20031231133647.TxNo.0580.01@copy3.xyz.co.jp>
10TH LINE  Mime-Version: 1.0
11TH LINE  Content-Type: message/partial; number=1; total=5;
12TH LINE  id="20041110104508.0000.TxNo.0105@copy3.xyz.co.jp"
13TH LINE
14TH LINE  Priority: 1 (Highest)
15TH LINE  Date: Wed, 31 Dec 2003 17:17:14 +0900
16TH LINE  From: <ifax@copy1.xyz.co.jp>
17TH LINE  Subject: ?ISO-2022-JP?B?GyRCO3FOQUF3SVUbKEI=?=
18TH LINE  To: =?ISO-2022-JP?B?GyRCIUozdCFLGyhCQUJD?= <ifax@abc.co.jp>
19TH LINE  Cc: =?ISO-2022-JP?B?GyRCMUQ2SBsoQjMbJElyXRsoQg==?= <ifax@copy2.xyz.co.jp>,
20TH LINE     =?ISO-2022-JP?B?GyRCMUQ2SBsoQjlbJElyXRsoQg==?= <ifax@copy3.xyz.co.jp>
21ST LINE  Bcc: =?ISO-2022-JP?B?GyRCMUQ2SBsoQjMbJElyXRsoQg==?= <ifax@copy1.xyz.co.jp>
22ND LINE  Message-Id: 20031231133647.TxNo.0580.01@copy3.xyz.co.jp
23RD LINE  Disposition-Notification-To: ifax@copy1.xyz.co.jp
24TH LINE  Mime-Version: 1.0
25TH LINE  Content-Type: multipart/mixed; boundary="AHMOALBJDADADADCDADAAAAOB"
26TH LINE
27TH LINE  --AHMOALBJDADADADCDADAAAAOB
28TH LINE  Content-Type: text/plain; charset="ISO-2022-JP"
29TH LINE
30TH LINE  · $B$*@$OC$K$J$C$F$*$j$  ̄ $9!# · (B
31ST LINE  · $B$40MMj$N;qNA$rAw$j$  ̄ $9!# · (B
32ND LINE
33RD LINE  --AHMOALBJDADADADCDADAAAAOB
34TH LINE  Content-Type: image/tiff; name="Image.tif";
35TH LINE  Content-Transfer-Encoding: base64
36TH LINE  Content-Disposition: attachment; filename="Image.tif"
37TH LINE
38TH LINE  SUkqAAgAAAARAP4ABAABAAAAgAAAAABAwABAAAAwAYAAAEBAwABAAAAgAgAAAIBAwABAAAAAQAA
39TH LINE  AAMBAwABAAAAAwAAAAYBAwABAAAAAAAAoBAwABAAAAgAAABEBBAABAAAA6gAAABIBAwABAAAA
40TH LINE  AQAAABUBAwABAAAAAQAAABYBBAABAAAAgAgAABcBBAABAAAAFIAAABoBBQABAAAA2gAAABsBBQAB
41ST LINE      ...
42ND LINE      ...
43RD LINE      ...
44TH LINE  eHlv+V8Uu/sOb4ri6KLe8wdXdfF1bntmEABonuluxl/nQPtBlt/ROCLqoiVRH3tzo10Ud8rHfueu
```

E-MAIL COMMUNICATION APPARATUS, E-MAIL COMMUNICATION METHOD AND PROGRAM

FIELD OF THE INVENTION

The present invention relates to an e-mail communication apparatus, an e-mail communication method and a program for receiving and processing electronic data attached to e-mail and transmitted.

BACKGROUND OF THE INVENTION

In recent years, e-mail for transmitting and receiving character information via a network is in widespread use along with diffusion of computers and networking of information. The e-mail is capable of attaching various types of files in addition to a message body which is the character information. For instance, there is diffusion of an Internet FAX (abbreviated as "NIFAX" hereafter) for transmitting and receiving an image by attaching a TIFF (Tag Image File Format) file as an attachment file.

The IFAX is a technology for communicating between apparatuses capable of converting the image read by a scanner to a TIFF format and transmitting it from a transmitter, reproducing the image in the TIFF format from data received by a receiver and printing it.

Here, in the case of transmitting the e-mail with a file of a large data size attached thereto, there is a possibility that delivery of the e-mail may delay due to a load applied to processing in a mail server, and if further deteriorated, the entire e-mail delivery service may stop. For that reason, in many cases, the mail server is generally set up not to receive the e-mail over a certain data size. There are the cases where, when the e-mail with an image of a large data size attached thereto is transmitted to the mail server thus set up from the IFAX, it is determined as a delivery error by the mail server.

For instance, in the case of transmitting the e-mail with an image attached thereto by using a PC, it is relatively easy to check the data size of the attached image. In the case of the IFAX, however, it is difficult to predict what the data size will be when scanning and transmitting the image, and so there is a high possibility that the above-mentioned delivery error may occur frequently. Thus, there is a proposal made as to a technology of an Internet facsimile apparatus for dividing image information of multiple pages by page and transmitting it (Japanese Patent Laid-Open No. 2000-32202).

There is also a proposal made as to a technology for, in the case of receiving e-mail data having the image information of multiple pages divided by page and transmitted, performing print and transfer processing in order of pages of original image information (Japanese Patent Laid-Open No. 2004-236005). Furthermore, there is a decided method of transmitting a piece of e-mail data by dividing it into multiple pieces of e-mail so as to synthesize received multiple pieces of e-mail data as one. In this case, message/partial as an identifier is used for MIME Content-Type (RFC 2045, RFC 2046).

RFC 2298 stipulates a specification wherein, in the case of receiving the e-mail, transmittal confirmation mail of a communication apparatus (IFAX) on a receiving side of the e-mail is sent back to the communication apparatus (IFAX) of a source of the e-mail. This specification is called MDN (Message Disposition Notification).

Here, in the case of performing transmittal confirmation of split e-mails divided into multiple pieces, the communication apparatus (IFAX for instance) on the transmitting side does not need to perform transmittal confirmation as to each piece of the split e-mails. To be more specific, the communication apparatus on the transmitting side has only to check whether or not one piece of the e-mail before being divided has been transmitted to the communication apparatus on the receiving side.

In the case where each piece of the split e-mails includes an MDN format for requesting the transmittal confirmation, however, the transmittal confirmation is requested of the communication apparatus on the receiving side according to the MDN format of each of the multiple pieces of the split e-mails.

In such a case, each time the split e-mails are received, the communication apparatus on the receiving side transmits the transmittal confirmation mail for the received split e-mails to the communication apparatus on the transmitting side accordingly. In such a configuration, the communication apparatus on the transmitting side receives multiple pieces of transmittal confirmation mail although just one request to send (RTS) consisting of the multiple pieces of the split e-mails was made. Thus, receiving processing and the like become complicated.

Even in the case where a part of the split e-mails is not transmitted from the communication apparatus on the transmitting side to the communication apparatus on the receiving side, the communication apparatus on the transmitting side receives some piece of transmittal confirmation mail. For that reason, there may be a disruption since it is not clear whether or not all the pieces of the split e-mails have been transmitted.

SUMMARY OF THE INVENTION

The present invention has been made in view of these circumstances, and an object thereof is to provide an e-mail communication apparatus, an e-mail communication method and a program which are improved.

Another object of the present invention is to provide the e-mail communication apparatus, e-mail communication method and program capable of, in the case of receiving e-mail which is split e-mails including request-to-send (RTS) information for transmitting the e-mail to a predetermined destination, suitably performing transmittal confirmation without transmitting to a source the e-mail of transmittal confirmation as to each of multiple pieces of the split e-mails.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5 is a diagram showing an example of split e-mail data transmitted in a state of transmission settings shown in FIG. 4;

FIG. 8 is a diagram showing the screen displayed on selecting a split e-mail piece 600 shown in FIG. 7 and pushing a division list button 620;

FIG. 11 is a flowchart for describing details of processing in the case where all the pieces of the split e-mails are not gathered in the divided reception box of the flowchart shown in FIG. 10 (step S521);

FIG. 12 is a diagram showing an example of the split e-mails data in which a format sentence of an MDN request is entered in head data of the mail before division.

DETAILED DESCRIPTION OF THE PREFERRED EMBODIMENTS

Figure 1:
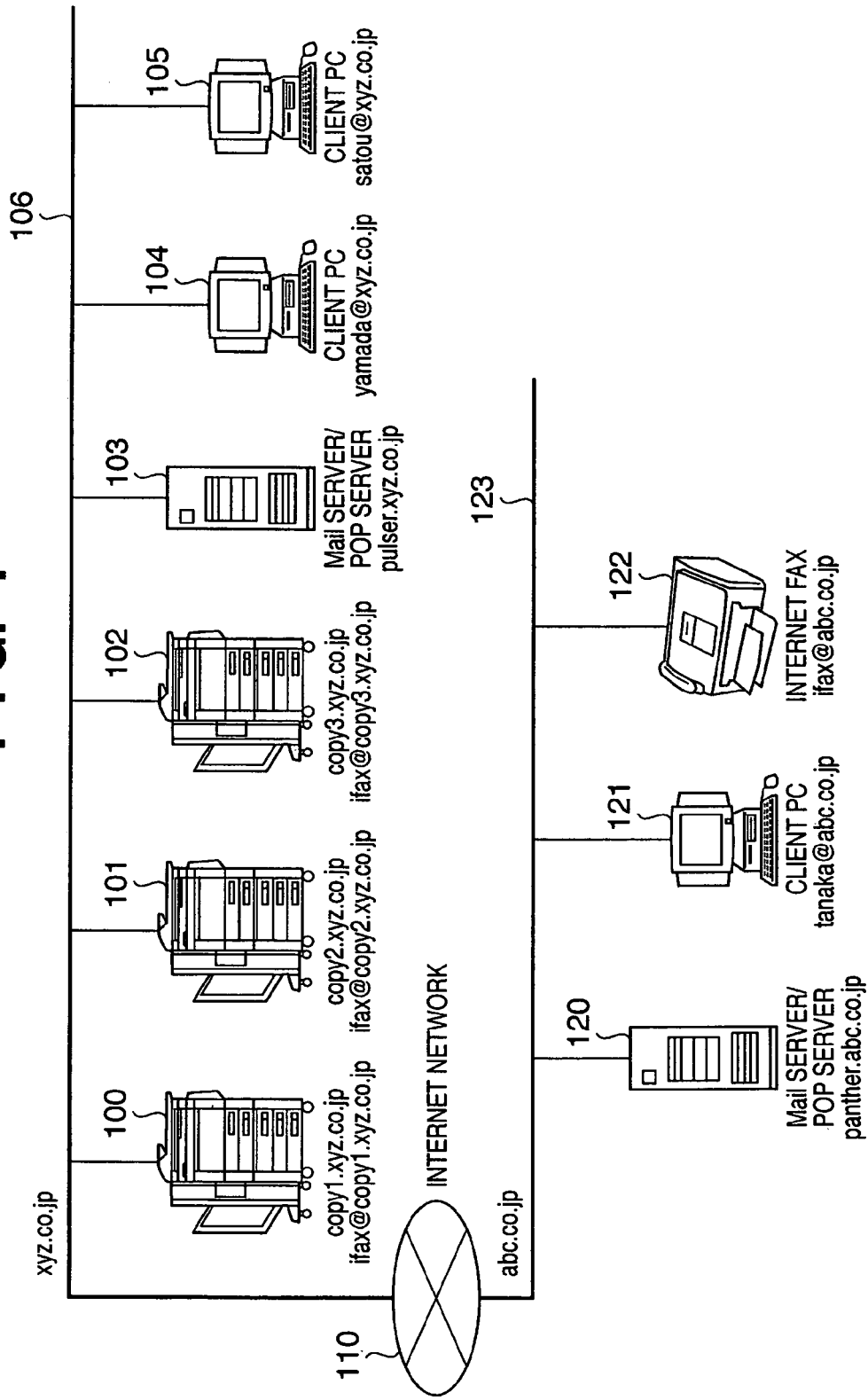
FIG. 1 is a block diagram of a network system having various devices provided with an information-processing apparatus according to an embodiment of the present invention connected via a network.

Hereunder, a description will be given by referring to the drawings as to details of configuration of a network system provided with an information-processing apparatus and communication processing of the network system according to an embodiment of the present invention.

FIG. 1 is a block diagram of a network system having various devices provided with an information-processing apparatus according to an embodiment of the present invention connected via a network. As shown in FIG. 1, multifunction peripherals (MFPs) 100, 101 and 102 have a scanner, a printer and the like mounted thereon and have a copy function and a facsimile sending and receiving function. The MFPs 100, 101 and 102 also have a printer function of printing data created on a computer. The MFPs 100, 101 and 102 are connected to a network 106 of which domain name is "xyz.co.jp." The MFPs 100, 101 and 102 are connected to multiple computers such as a mail server/POP server 103, client PCs 104 and 105 and various network devices. The information-processing apparatus according to this embodiment is mounted on each of the MFPs 100, 101 and 102, mail server/POP server 103 and client PCs 104 and 105.

The above-mentioned network 106 is further connected to an Internet network 110 spread all over the world. The network 106 is also connected to a network 123 of which domain name is "abc.co.jp" having a mail server/POP server 120, a client PC 121 and an Internet FAX 122 connected thereto. The information-processing apparatus according to this embodiment is also mounted on the mail server/POP server 120, client PC 121 and Internet FAX 122.

As shown in FIG. 1, the MFP 100 is given a host name of "copy1, xyz.co.jp" and an e-mail address of "ifax@copy1.xyz.co.jp." The MFP 101 is given a host name of "copy2, xyz.co.jp" and an e-mail address of "ifax@copy2.xyz.co.jp." Furthermore, the MFP 102 is given a host name of "copy3, xyz.co.jp" and an e-mail address of "ifax@copy3.xyz.co.jp."

Furthermore, the client PC 104 has general-purpose e-mail software installed thereon, and is given an e-mail address of "yamada@xyz.co.jp." Similarly, the client PC 105 also has the general-purpose e-mail software installed thereon, and is given an e-mail address of "satou@xyz.co.jp." Furthermore, the mail server/POP server 103 has the functions of both the mail server and POP server.

The client PC 121 has general-purpose e-mail software installed thereon, and is given an e-mail address of "tanaka@abc.co.jp." The Internet FAX 122 also has the general-purpose e-mail software installed thereon, and is given an e-mail address of "ifax@abc.co.jp." Furthermore, the mail server/POP server 120 has the functions of both the mail server and POP server.

For instance, in the case where the client PC 104 transmits the e-mail created by the e-mail software to "tanaka@abc.co.jp" in the system shown in FIG. 1, the system performs the following procedure. To begin with, the client PC 104 requests the mail server/POP server 103 to deliver the e-mail by an SMTP (Simple Mail Transfer Protocol) protocol. And the mail server/POP server 103 delivers the e-mail data to the mail server/POP server 120 by the SMTP protocol by way of the Internet network 110. The e-mail is thereby stored in a mailbox of "tanaka@abc.co.jp" in the mail server/POP server 120.

As previously described, the client PC 121 also has the general-purpose e-mail software installed thereon. And the client PC 121 monitors at intervals whether or not the e-mail has arrived in the mailbox of "tanaka@abc.co.jp" existing in the mail server/POP server 120 by using a POP 3 protocol. In the case where the e-mail has arrived in the mail server/POP server 120, the client PC 121 receives the e-mail. The POP 3 protocol is an abbreviation of Post Office Protocol-Version 3.

In the case of inversely transmitting the e-mail from "tanaka@abc.co.jp" of the client PC 121 to "yamada@xyz.co.jp" of the client PC 104, the system performs the following procedure. To begin with, the client PC 121 requests the mail server/POP server 120 to deliver the e-mail by an SMTP protocol. And the mail server/POP server 120 delivers the e-mail to the mail server/POP server 103. The e-mail is thereby stored in the mailbox of "yamada@xyz.co.jp" in the mail server/POP server 103.

And the client PC 104 monitors at intervals whether or not the e-mail has arrived in the mailbox of "yamada@xyz.co.jp" existing in the mail server/POP server 103 by using the POP 3 protocol. In the case where the e-mail has arrived in the mail server/POP server 103, the client PC 104 receives the e-mail.

In FIG. 1, the MFPs 100, 101 and 102 can execute an "e-mail transmission mode" for transmitting image data by general e-mail. The MFPs 100, 101 and 102 can also execute an "I FAX transmission mode" on the premise of transmitting it to an apparatus meeting the IFAX standards.

The image data transmitted by the MFPs 100, 101 and 102 is exemplified by the following image data. For instance, there is the image data received by the MFPs 100, 101 and 102 by using a facsimile (FAX) function. There is also the image data received by the MFPs 100, 101 and 102 by using an Internet facsimile (IFAX) function. And there is the image data read by the MFPs 100, 101 and 102 by means of the scanner.

As for the transmission and reception of the e-mail by the MFPs 100, 101 and 102, the above-mentioned SMTP and POP 3 are used to perform the same operation as the transmission and reception of the e-mail by the above-mentioned client PC 104 and client PC 121.

In the "e-mail transmission mode," when a color image is read by a scanner 134, the MFPs 100, 101 and 102 can transmit the image data in a JPEG format or PDF (Portable Document Format). In the "e-mail transmission mode," when a monochrome image is read by the scanner, the MFPs 100, 101 and 102 can transmit the image data in TIFF or PDF. In the case where the e-mail is transmitted from the MFP 100, 101 or 102 to the e-mail address of "yamada@xyz.co.jp" given to the client PC 104, the client PC 104 receives the e-mail by the POP 3 protocol. Thus, a user using the client PC 104 can display the received e-mail on a general-purpose image viewer.

In the "IFAX transmission mode," the MFPs transmit the image read by the scanner 134 as the image data in the TIFF format meeting RFC 2301 by the SMTP and POP 3 protocols.

As for the MFPs, the image data received by the scanner, FAX and IFAX receiving functions on a transmitting side is received by a receiver at a remote location, and the received image is printed by a printer at a remote location.

Figure 2:
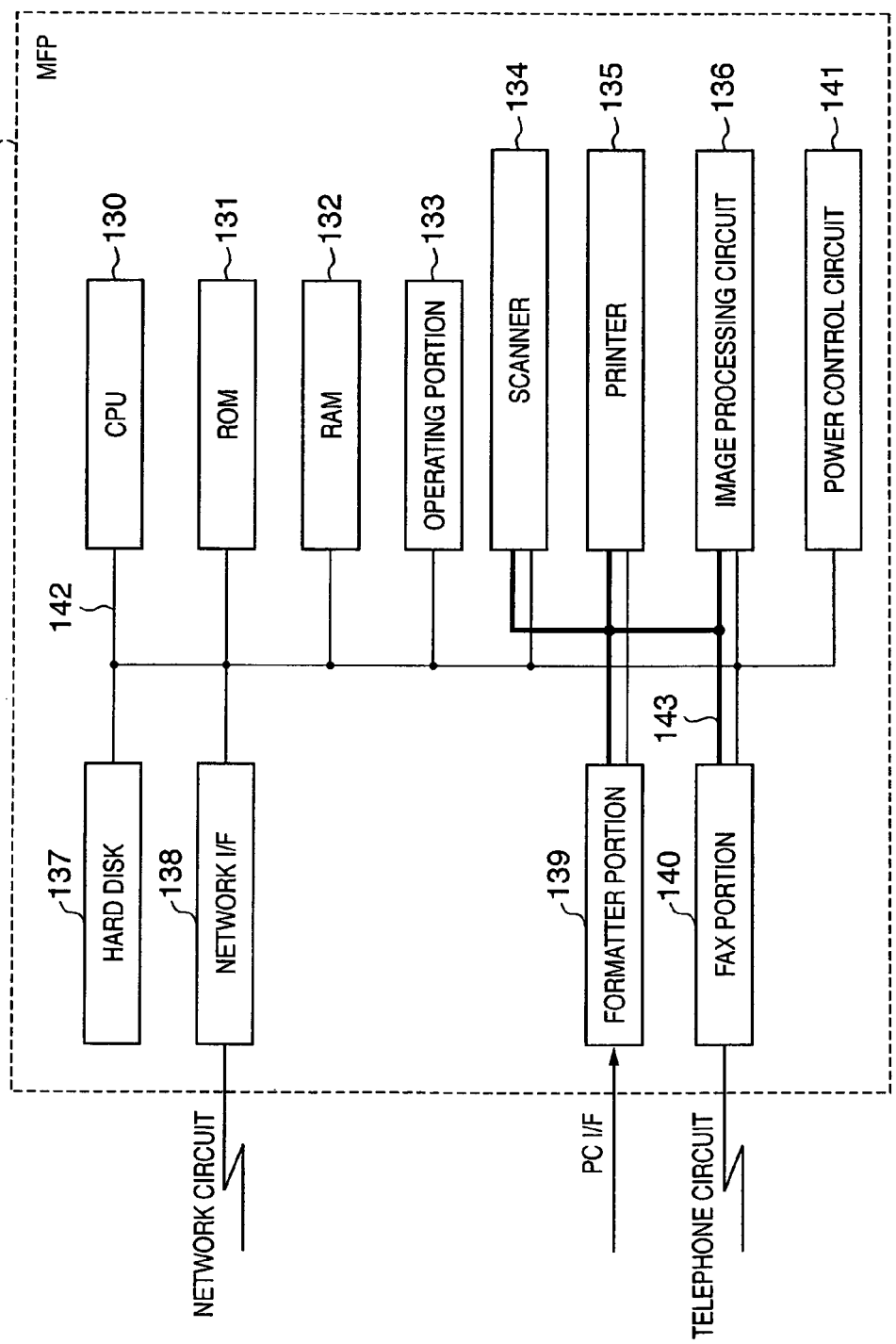
FIG. 2 is a block diagram showing detailed configuration of an MFP 100 shown in FIG. 1.

FIG. 2 is a block diagram showing detailed configuration of the MFP 100 shown in FIG. 1. Of the MFPs shown in FIG. 1, only the MFP 100 will be described hereunder. However, the other MFPs 101 and 102 have the same configuration as the MFP 100.

In FIG. 2, a CPU 130 is a control circuit for controlling the entire system of the MFP 100 by using a program stored in an ROM 131 and a temporary storage area of an RAM 132 functioning as a memory.

An operating portion 133 is configured by an LCD panel and hard keys such as a start key and a numeric keypad and the like. And the operating portion 133 is a unit for displaying various buttons on the LCD by using a touch panel to detect a position at which the button is touched by the user's finger and perform a user operation based on it smoothly.

Figure 13:
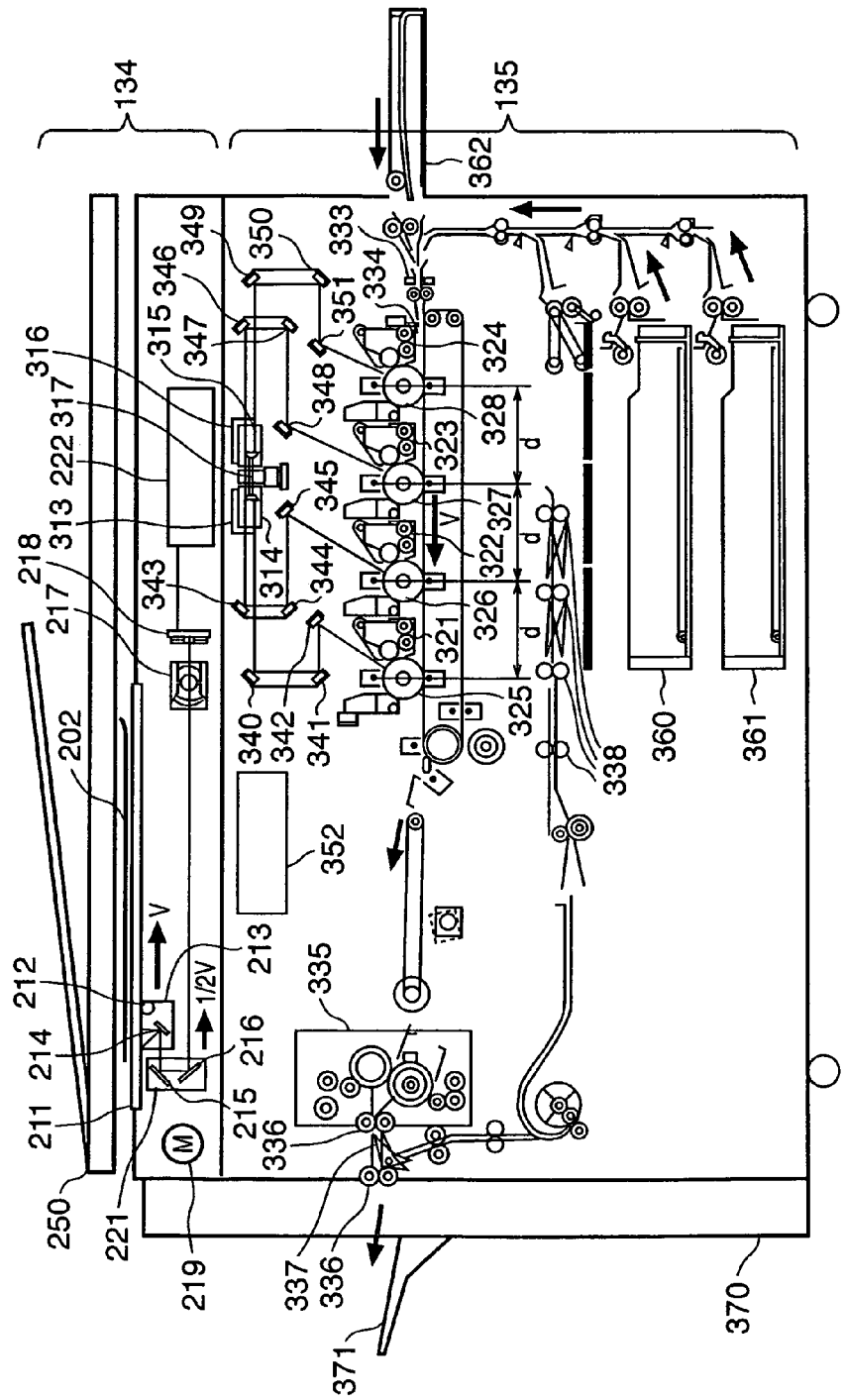
FIG. 13 is an equipment configuration diagram of a scanner 134 and a printer 135 of the MFP 100 shown in FIG. 1.

The scanner 134 is a unit for converting the image on a copy to the image data by means of photoelectric conversion. FIG. 13 is an equipment configuration diagram of the scanner 134 and a printer 135 of the MFP 100 shown in FIG. 1. The scanner 134 carries the copy from a copy feeding apparatus 250 onto a platen glass 211. And if the copy is carried onto the platen glass 211, it lights a lamp 212 and starts moving a scanner unit 213 so as to perform an exposure scan on the copy. Reflected light from the copy is led to a CCD image sensor 218 by mirrors 214, 215, 216 and a lens 217 and converted to electrical signals, and is then converted to digital data by an A/D converter circuit. The copy on the platen glass 211 is ejected after a reading operation of the copy is finished.

The printer 135 is a unit for printing electrical image data on recording paper. The printer 135 has a laser beam according to the electrical image data emitted from laser emitting portions 313, 314, 315 and 316 to have photoconductive drums 325, 326, 327 and 328 radiated therewith. The photoconductive drums 325, 326, 327 and 328 have latent images according to the laser beam formed thereon. And a developer is attached to the portions of the latent images of the photoconductive drums 325, 326, 327 and 328 by developing devices 321, 322, 323 and 324. The printer 135 feeds the recording paper from paper cassettes 360, 361 and 362 and carries it to a transfer portion in timing synchronized with a start of laser beam radiation. And the printer 135 transfers the developer attached to the photoconductive drums 325, 326, 327 and 328 to the recording paper. The recording paper having the developer thereon is carried to a fixing portion 335, and the developer is fixed on the recording paper by heat and pressure of the fixing portion 335. The recording paper having passed the fixing portion 335 is ejected to a catch tray 371 by an ejecting roller 336.

In FIG. 2, an image processing circuit 136 is configured by a large-capacity image memory an image rotation circuit, a resolution variable circuit, and encoding/decoding circuits such as MH, MR, MMR, JBIG and JPEG. And the image processing circuit 136 can perform various image processing, such as shading, trimming and masking. A hard disk 137 is a large-capacity recording medium connected by an interface such as SCSI or USB, for which not only the hard disk but another recording medium such as an MO may be used.

Furthermore, in FIG. 2, a network I/F 138 is a circuit for executing a network data link for connecting to a network circuit such as Ethernet (registered trademark) represented by 10 BASE-T and 100 BASE-T or token-ring.

Furthermore, a formatter portion 139 comprises PC I/F circuits such a parallel interface and a USB compliant with IEEE 1284. And the formatter portion 139 creates the image data from PDL (Page Description Language) data from the PC received by the PC I/F circuit or network I/F circuit. The image processing circuit 136 performs image processing on the image data created by the formatter portion 139 and generates print data to be printed by the printer 135.

A FAX portion 140 is a facsimile I/F circuit connected to a telephone circuit and configured by circuits such as an NCU (Network control Unit) and a MODEM (Modulator/Demodulator).

The MFP 100 can perform the image processing on the image data read by the scanner 134 in the image processing circuit 136 and transmit it to another facsimile apparatus by way of the telephone circuit. The MFP 100 can also receive the image data transmitted from the other facsimile apparatus and perform the image processing thereon in the image processing circuit 136 so as to have it printed by the printer 135.

The above-mentioned scanner 134, printer 135, image processing circuit 136, formatter portion 139 and FAX portion 140 are connected by a high-speed video bus 143 separate from a CPU bus 142 from the CPU 130 and configured to be able to transfer the image data at high speed.

The MFP 100 operates to perform the image processing on the image data read by the scanner 134 in the image processing circuit 136 and print the read image on the printer 135 so as to implement the copy function.

Furthermore, the MFP 100 has a send function of performing the image processing on the image data read by the scanner 134 in the image processing circuit 136 and transmitting it from the network I/F onto the network. The MFP 100 also has an IFAX function of creating the image data meeting RFC 2301 in the image processing circuit 136 and transmitting and receiving the data by e-mail.

Furthermore, in FIG. 2, a power control circuit 141 is a circuit for controlling electric power consumed by the MFP 100, which can reduce power consumption of the apparatus by lowering temperature of a heater and the like or turning off the power to an unused circuit. The MFP 100 has a "SLEEP 1 state" in which energization of fixed temperature control circuits of the operating portion 133 and printer 135 is stopped by the power control circuit 141 and a "SLEEP 2 state" in which the energization of most circuits including the CPU 130 is stopped.

In the SLEEP 1 state, the power consumption is higher than the SLEEP 2 state. When instructed to start, however, it starts and is put in a usable condition faster than the SLEEP 2 state. In the case of the SLEEP 2 state, electric power supply to the CPU 130 also stops so that the software of the MFPs 100 becomes inexecutable.

The CPU 130 is started and released from the SLEEP 2 state by a communication request from external I/Fs such as the network I/F 138, formatter portion 139 and FAX portion 140 shown in FIG. 2 or by pushing a power saving key 411 existing in the operating portion 133 described later. The MFP 100 goes into the SLEEP 1 state if released from the SLEEP 2 state. If the image is put in the printer 135 by communication data from the external I/F, the MFP 100 is released from the SLEEP 1 state and goes into a standby state. Thereafter, if a printing process is finished and a predetermined time elapses in the standby state, it moves on to the SLEEP 1 state. It also moves on to the SLEEP 1 state in the case where the power saving key 411 is pushed. And it goes into the SLEEP 2 state after the predetermined time elapses in the SLEEP 1 state.

Figure 3:
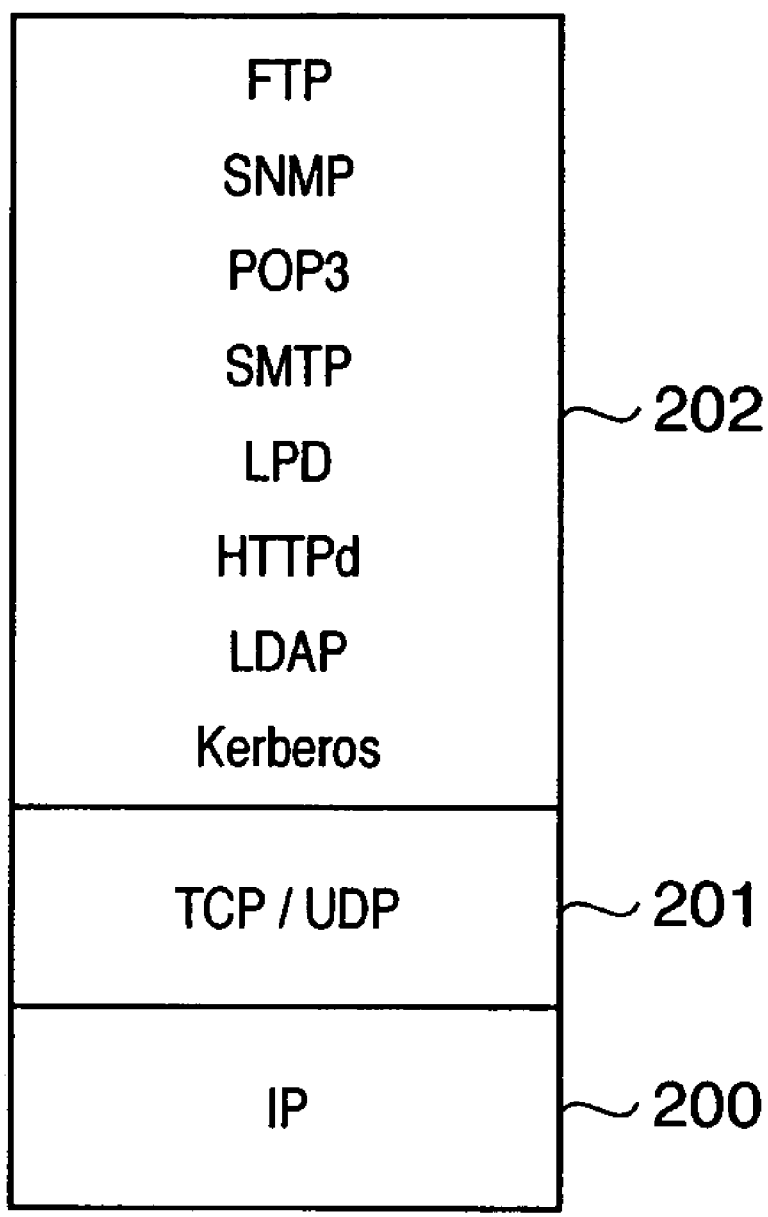
FIG. 3 is a diagram for describing configuration of a network program possessed by the MFP 100.

FIG. 3 is a diagram for describing the configuration of a network program executed by the MFP 100. As shown in FIG. 3, the configuration of the network program of the MFP 100 can be roughly divided into the following three layers of programs. These programs are stored in the hard disk 137 and the like to be executed by the CPU 130.

IP (Internet Protocol) 200

TCP (Transmission Control Protocol)/UDP (User Datagram Protocol) 201

Various protocols 202 of application layers

First, the IP 200 is an Internet protocol layer for providing a service of sending a message from an originating host to a destination host in collaboration with a relay node such as a router. The IP 200 manages originator addresses for transmitting the data and destination addresses for receiving the data, and executes a routing function of managing what route is taken in the network to deliver the data to the destination host according to address information.

The TCP/UDP 201 is a transport layer for providing a service of sending a message from an originating application process to a receiving application process. The TCP is a connection type service which assures high reliability of the communication. The UDP is a connectionless type service which does not assure reliability.

Various protocols 202 of the application layers prescribe multiple protocols. The protocols include FTP (File Transfer Protocol) which is a file transfer service and SNMP which is a network management protocol. They also include LPD which is a server protocol for printer printing and HTTPd which is a protocol of a WWW (World Wide Web) server. Furthermore, they include the SMTP (Simple Mail Transfer Protocol) as an e-mail transmission and reception protocol and the POP 3 (Post Office Protocol-Version 3) as a mail download protocol. Furthermore, they include LDAP (Lightweight Directory Access Protocol) which is a protocol for accessing a directory database managing the e-mail addresses of the user and the like. In addition, a Kerberos authentication program prescribed by RFC 1510 is also included.

Figure 4:
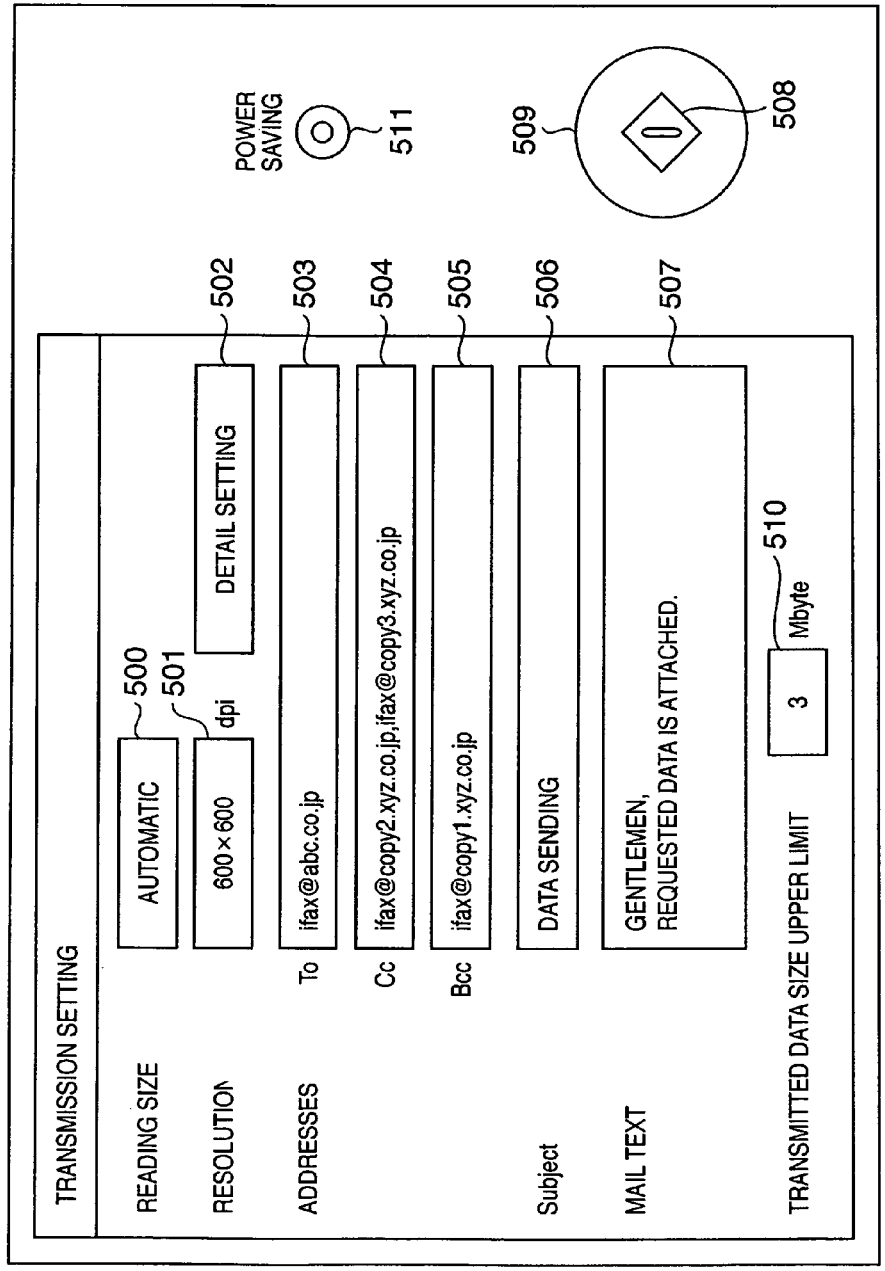
FIG. 4 is a diagram showing an example of a transmission setting screen of an operating portion 133 when transmitting image data read by a scanner 134 by e-mail.

FIG. 4 is a diagram showing an example of a transmission setting screen of the operating portion 133 when transmitting the image data read by the scanner 134 by e-mail. The MFP 100 can specify a copy size to be read by the scanner 134 as a reading size. For instance, a size setting portion 500 can specify a paper size such as A3, A4, A5, B4, B5, 11×17, LTR or STMT and orientation thereof. As shown in FIG. 4, it is currently set to "Automatic" and reading is performed at a value detected by a copy detecting sensor existing in the scanner 134.

A resolution setting portion 501 can specify a resolution when the scanner 134 reads the image. For instance, it can be specified out of 200×100, 200×200, 200×400, 300×300, 400× 400 and 600×600 dpi. A default value of the resolution is 200×200 for instance. However, it is currently set to 600×600 dpi.

Furthermore, a detail setting portion 502 can specify a detailed operation on scanning, such as density setting, copy type specification, both-side reading, continuous page shooting and image quality adjustment on scanning.

As shown in FIG. 4, in the case of selecting the destination, it is further possible, with a To field 503 of an e-mail destination, to select a destination from those registered with an address book. Similarly, in the case of selecting the destination, it is possible, with a Cc field 504, to select a destination from those registered with the address book. Furthermore, in the case of selecting the destination, it is possible, with a Bcc field 505, to select a destination from those registered with the address book. Moreover, a maximum number of destinations is 256 addresses for instance. Therefore, the value as a total of the number of destinations selected by the To field 503, the number of destinations selected by the Cc field 504 and the number of destinations selected by the Bcc field 505 is limited to 256 addresses at the maximum.

Furthermore, in FIG. 4, a subject entry portion 506 and a text entry portion 507 are fields for entering a subject and mail text provided to the e-mail to be transmitted respectively. For instance, the operating portion 133 can have a soft keyboard displayed to have character strings entered in the case where each of the fields is selected.

Furthermore, in FIG. 4, a transmitted data size upper limit setting portion 510 is a portion for setting a maximum size of the e-mail data allowed on transmitting the e-mail. The e-mail data exceeding a set data size is divided into multiple pieces of the e-mail and transmitted as will be described later. To be more specific, the e-mail of the data size larger than the limit is not transmitted as a result. In the case where "0" is set as the limit, it is possible to operate as limitless and have no division of the e-mail performed.

The above-mentioned embodiment described the case of placing a limit on the transmission according to the data size of the transmitted e-mail. However, another method may be taken. For instance, it is also possible to handle the limit of the data size by converting it to image size of a TIFF file or a JPEG file to be transmitted.

It is possible to change a transmitted data size upper limit for transmission operation each time by setting it on the transmission setting screen shown in FIG. 4 as previously described. In the case where there is no need to change it for the transmission operation each time, it may be set as a part of device information management. In the case of changing the value of the upper limit for each of the destinations, it is possible to render the upper limit settable for each of the destinations of the address book.

Furthermore, a start key 509 shown in FIG. 4 is a hard key placed beside the operating portion 133. If the user pushes this key, the scanner 134 is driven and the read image data is transmitted as the e-mail. The start key 509 has a blue and red LEDs 508 mounted at its center. And in the case where no destination is specified, the red LED lights up to let the user know that the scanner 134 is in a state not to be driven even if the start key 509 is pushed. In the case where even one destination is specified, the blue LED lights up to let the user know that the scanner 134 is in a state to be driven.

Furthermore, a power saving key 511 is a hard key capable of shifting to the aforementioned sleep state by means of the power control circuit 141 if pushed in the standby state and returning to the standby state if pushed in the sleep state.

Figure 6:
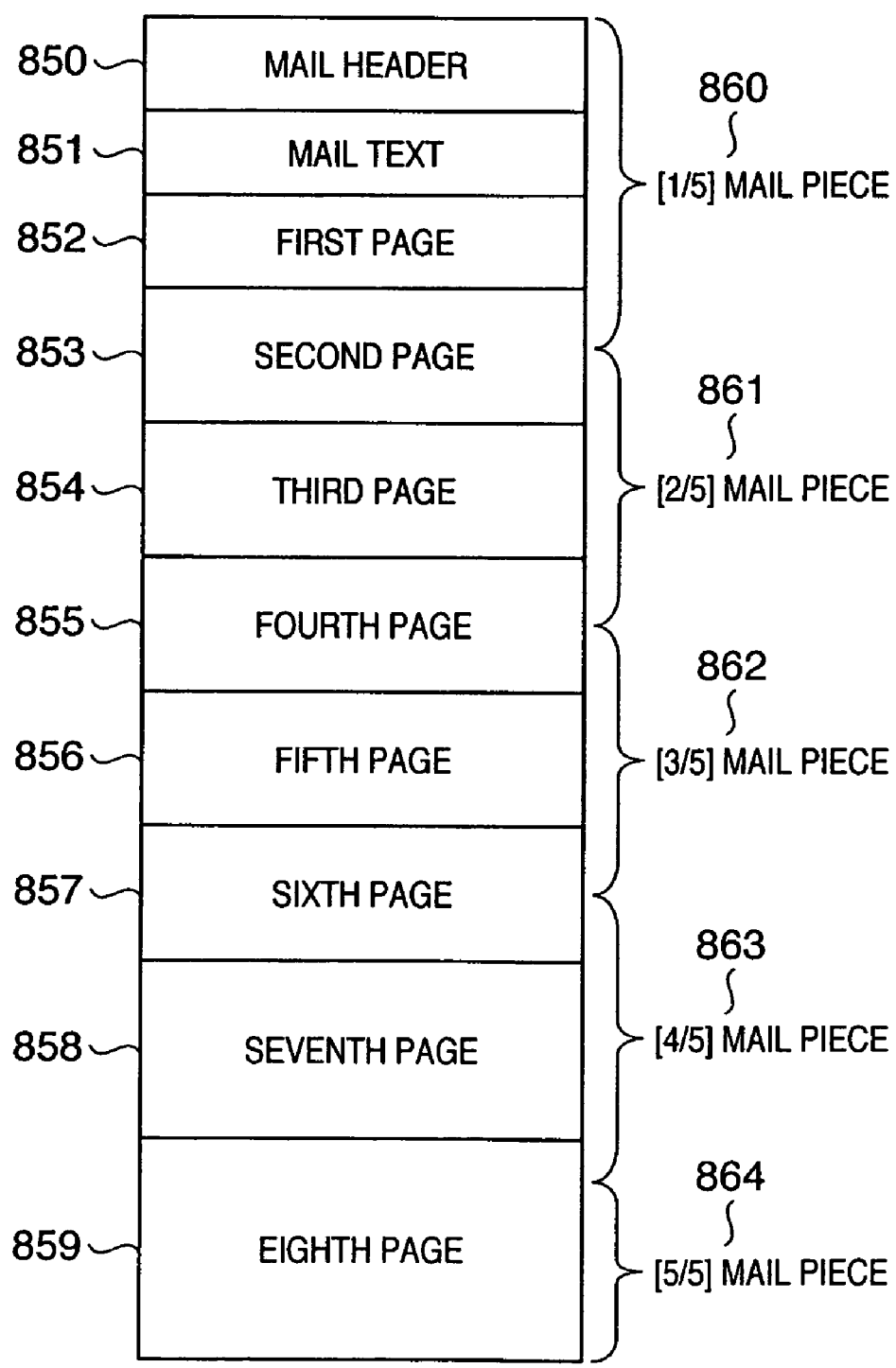
FIG. 6 is a diagram for describing an aspect of dividing the e-mail having an image file attached thereto into five pieces of split e-mails.

FIG. 6 is a diagram for describing an aspect of dividing the e-mail having an image file attached thereto into five pieces of split e-mails. As shown in FIG. 6, the e-mail data is configured by a mail header 850, a mail text 851, a first-page image data 852, a second-page image data 853, a third-page image data 854, a fourth-page image data 855 and a fifth-page image data 856. The e-mail is divided into five pieces as shown in FIG. 8, and is configured by a [1/5] split e-mail piece 860, a [2/5] split e-mail piece 861, a [3/5] split e-mail piece 862, a [4/5] split e-mail piece 863 and a [5/5] split e-mail piece 864.

When transmitting the split e-mails, a partial mail header similar to the mail header 850 having destination information and the like described thereon is added to a head of each piece of the mail. And the information is added thereto, such as a MIME identifier indicating that the e-mail is the split e-mails, a division ID uniquely attached to each piece of the split e-mails, a division number and a division total number.

FIG. 5 is a diagram showing an example of the split e-mails transmitted in the state of transmission settings shown in FIG. 4. In FIG. 5, the portion from the 1st line to the 13th line is the mail header for delivering the split e-mails. From of the 3rd line has the e-mail address given to the MFP 100 described thereto. Subject of the 4th line is the data having the character string entered in the subject entry portion 506 rendered as an encoded-word format defined by RFC 2047. Furthermore, To of the 5th line is the destination selected in the To field 503, and a Cc field 405 is the destination selected in the Cc field 504. And a Bcc field 407 is the data on the destination selected in the Bcc field 505 rendered as the encoded-word format. The 10th line is the data indicating an MDN format included in the mail for requesting a transmittal confirmation of the e-mail from a communication apparatus of the source.

"Content-Type: message/partial;" of the 12th line indicates that this mail is the split e-mails, and "number=1; Total=5" indicates that it is the first piece of the data on the mail divided into five pieces. Furthermore, "id="20041110104508.0000.TxNo.0105@copy3.xyz.co.jp"" of the 13th line indicates a division ID number of the split e-mails. The division ID number consists of a date, time, a transmission reception number counted up on transmission each time, and a domain name of a transmitter. Pieces of the mail having the same ID number are regarded as the split e-mails having the same mail divided.

Next, the data from the 15th line to the 44th line shows substantive data on the split e-mails (that is, the first piece of data on the mail divided into five pieces). First, the portion from the 15th line to the 25th line is the mail header of the divided e-mail equivalent to the mail header 850. From of the 17th line, To of the 19th line, Cc of the 20th line and Bcc of the 22nd line are the same as the above From of the 3rd line, To of the 5th line, Cc of the 6th line and Bcc of the 8th line.

Subject of the 18th line is Subject before being divided, which is the data having the character string "transmit data" entered in the subject entry portion 506 rendered as the encoded-word format. In comparison, Subject of the 4th line is Subject of the split e-mails, which is the data having the character string "[1/5]" given to the head thereof and having the character string "[1/5] transmit data" rendered as the encoded-word format.

Furthermore, the 30th line and 31st line are text data having the mail text entered in the text entry portion 507 converted to a JIOS code, which is equivalent to the mail text 851. As the mail text is Japanese text data, the data of "Content-Type: text/plain; charset="ISO-2022-JP"" is given in the 28th line.

Furthermore, the data from the 38th line to the 44th line is equivalent to the data 852 up to the first page, which is the data having the data read from the scanner rendered as a TIFF image file with a file name Image.tif and having this file-BASE64-encoded. That is specified in the 34th, 35th and 36th lines. As for the data from the second page onward, the same mail with the division numbers of 2, 3, 4 and 5 is generated and transmitted. To be more specific, the portions such as the mail header are common except that number of the 12th line changes to 2, 3, 4 and 5 respectively and Message-ID of the 9th line is different as to each piece of the mail.

It is possible to extract the pieces of the mail data having the same division ID number and combine them in the order indicated by the numbers thereof so as to synthesize them as the mail data before it was divided.

Figure 7:
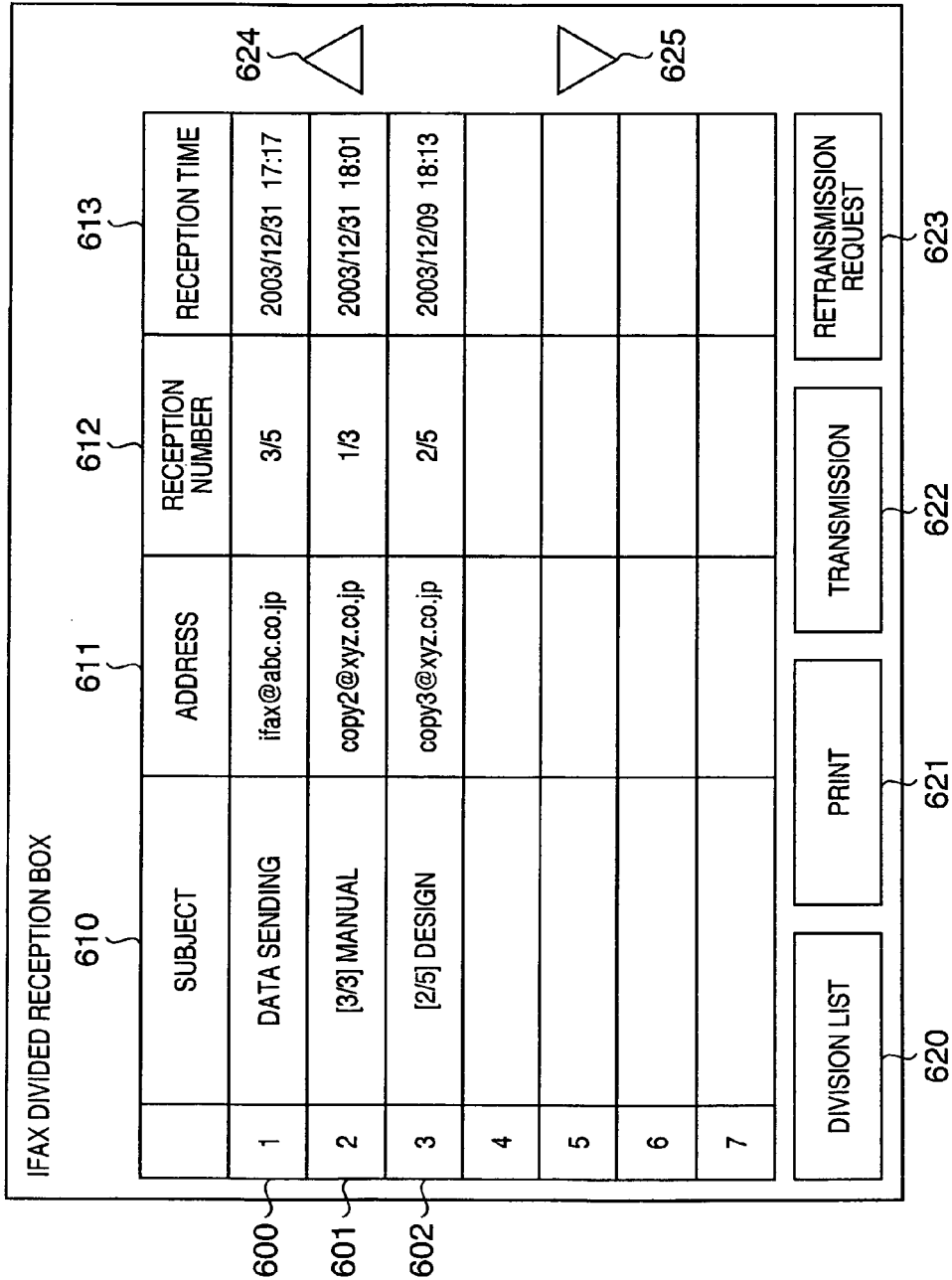
FIG. 7 is a diagram showing a screen example of a divided reception box displayed on the operating portion 133 when the split e-mails are temporarily stored.

FIG. 7 is a diagram showing a screen example of a divided reception box displayed on the operating portion 133 when the split e-mails are temporarily stored. As shown in FIG. 7, three different pieces 600, 601 and 602 of the split e-mails are currently stored in the divided reception box. In FIG. 7, a subject 610 is the subject of each piece of the received split e-mails. In the case of the split e-mails shown in FIG. 5, Subject of the 4th line indicating the subject of the split e-mails or Subject of the 18th line as the subject of the mail before the division is displayed.

As for the split e-mail piece 600, a leading piece of the split e-mails can be received and so Subject of the 18th line as the subject of the split e-mails is displayed. As for split e-mail pieces 601 and 602, the leading piece of the mail cannot be received and so Subject of the 4th line as the subject of each piece of the split e-mails is displayed.

In FIG. 7, an address 611 indicates a sender of the e-mail. In the case where the leading mail piece of the split e-mails has been received, From information of the 17th line is assigned. In the case where the leading mail piece has not been received, the value of the From information shown in the 3rd line as the From information of the split e-mails is assigned.

Furthermore, a reception number 612 is the value indicating the total number of the mail pieces having the same division ID and the number of received mail pieces. For instance, it indicates that there are five split e-mail pieces 600 in total and there are three received mail pieces. Moreover, a reception time 613 indicates the reception time at which each piece of the split e-mails was received for the first time.

Furthermore, a division list button 620 is a button for listing the selected split e-mails one by one. And a print button 621 and a transmission button 622 are the buttons for printing and transmitting the synthesized mail after combining the selected split e-mails respectively. They will be described in detail by using FIG. 12 later. Furthermore, a retransmission request button 623 is a button for requesting the source to perform a retransmission in the case where all the split e-mails are not gathered. This will be described by using FIG. 9 later. Furthermore, in FIG. 7, arrow keys 624 and 625 are keys for an operator to scroll the screen in the case where there are so many split e-mails to be listed that all of them cannot be displayed and listed at once.

FIG. 8 is a diagram showing the screen displayed on selecting the split e-mail piece 600 shown in FIG. 7 and pushing the division list button 620. In FIG. 8, three split e-mail pieces 660, 661 and 662 are displayed. All those displayed in the list on the screen shown in FIG. 8 have the same division ID, and the value thereof is displayed in a division ID 650. The value indicated as the division ID is created based on the data of the 9th line shown in FIG. 5.

In FIG. 8, an address 651 is the same data as the address 611, which indicates e-mail sender information. A subject 652 is subject information on the split e-mails, which is the subject information of the 4th line in FIG. 5. A division number 653 is the division number of the split e-mails, which is the value of number/total of the 12th line. As for the value of total, it is allowed not to enter the value except the last piece of the split e-mails. Therefore, there may be the cases where the value of total is not entered.

Furthermore, in FIG. 8, a data size 654 is the data size of each piece of the split e-mails, and a reception time 655 is the time at which each piece of the split e-mails was received. Moreover, a return key 658 is the key for returning to the screen shown in FIG. 7 by closing the screen shown in FIG. 8, and scroll keys 656 and 657 are the keys for the operator to scroll the screen in the case where there are so many lists that all of them cannot be displayed at once.

Figure 9:
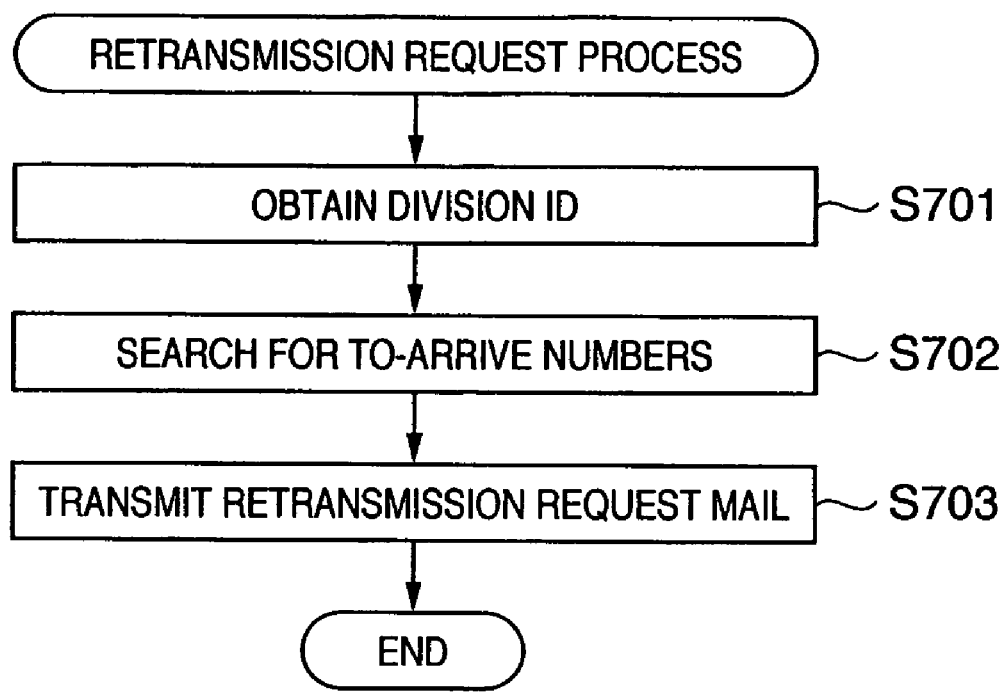
FIG. 9 is a flowchart for describing a retransmission request procedure of the MFP 100 in the case where a retransmission request button 623 is pushed in the screen example of the divided reception box displayed on the operating portion 133 shown in FIG. 7.

FIG. 9 is a flowchart for describing a retransmission request procedure of the MFP 100 in the case where the retransmission request button 623 is pushed in the screen example of the divided reception box displayed on the operating portion 133 shown in FIG. 7.

First, if the retransmission request button 623 is pushed and the retransmission request is received, the division IDs are obtained from the list selected on the screen shown in FIG. 7 (step S701). Next, of the same division IDs as those obtained in the step S701, a search is performed for the division numbers of the split e-mails yet to be obtained (to-arrive numbers) (step S702). And retransmission request mail for the split e-mails yet to be obtained is created and transmitted to the source (step S703) so as to finish the retransmission request procedure.

Figure 10:
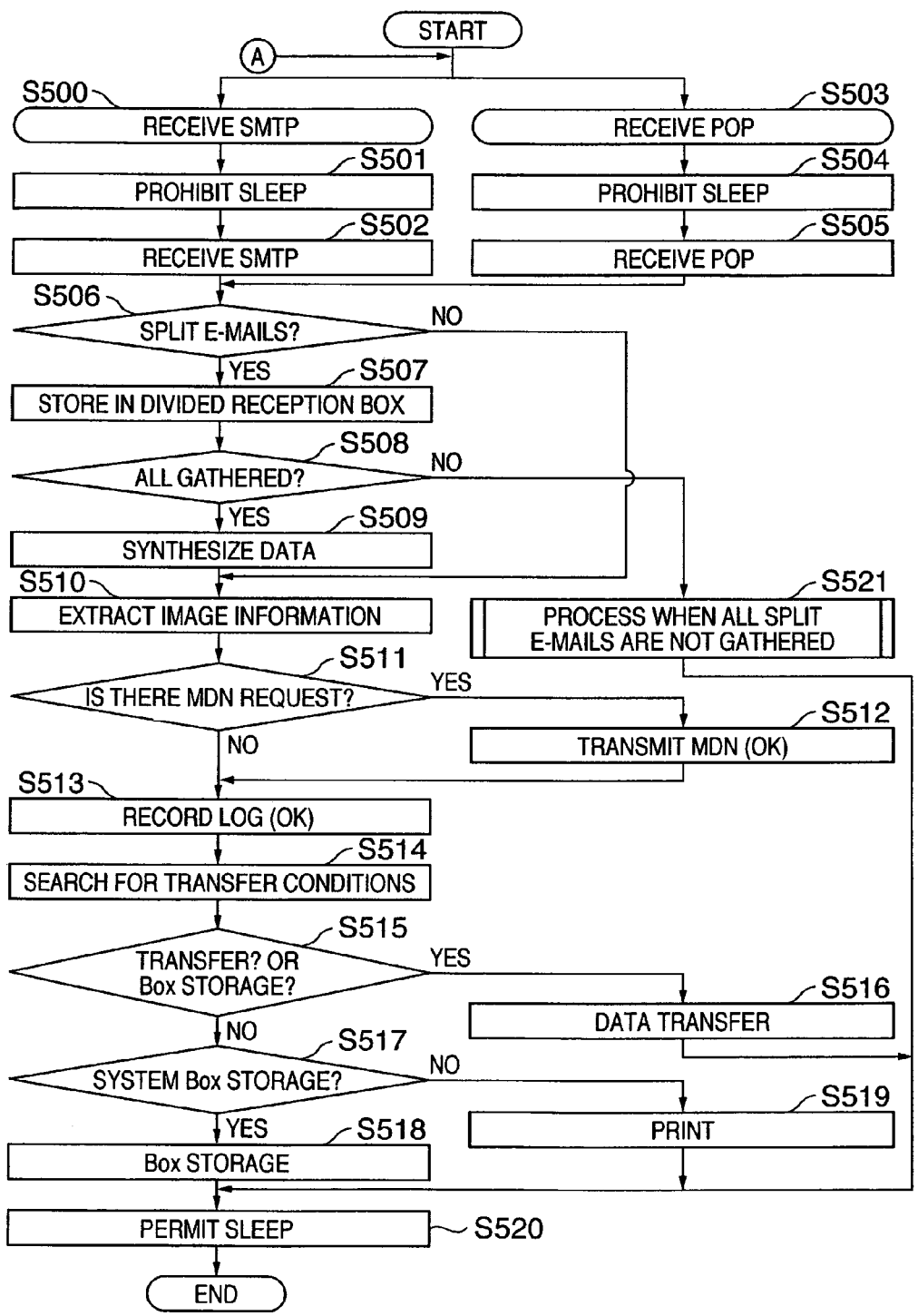
FIG. 10 is a flowchart for describing a procedure for receiving, combining, printing or transferring the split e-mails of the MFP 100 according to an embodiment of the present invention.

FIG. 10 is a flowchart for describing a procedure for receiving, combining, printing or transferring the split e-mails of the MFP 100 according to an embodiment of the present invention. The steps of FIG. 10 are performed by the CPU 130.

The MFP 100 starts an SMTP receiving process by receiving an SMTP request from the network I/F 138 (step S500). Here, the MFP 100 starts the CPU 130 with an interrupt signal from the network I/F 138 in the case where the MFP 100 is in the SLEEP 2 state on receiving the SMTP request from the network I/F 138. And the MFP 100 releases the SLEEP 2 state by means of the power control circuit 141. Thus, an order to prohibit the CPU 130 from being put in the SLEEP 2 state is given by the SMTP request (step S501). Consequently, the CPU 130 is not put in the SLEEP 2 state until the SLEEP is permitted next. And the MFP 100 receives the e-mail data by the SMTP protocol (SMTP reception) (step S502).

The CPU 130 has a timer interrupt signal inputted thereto by an unshown timer at every predetermined time to start a process for performing POP reception (step S503). In the case where the MFP 100 is in the SLEEP 2 state, the interrupt signal starts the CPU 130 so that the SLEEP 2 state is released by the power control circuit 141. And the order to prohibit the CPU 130 from being put in the SLEEP 2 state is given (step S504). Consequently, the CPU 130 is not put in the SLEEP state until the SLEEP is permitted next. And the MFP 100 receives the e-mail data stored in the mail server/POP server by the POP 3 protocol (POP reception) (step S505).

MIME data is analyzed as to the e-mail received by the MFP 100 by the SMTP reception (step S502) or the POP reception (step S503). The CPU 130 determines whether or not the e-mail is the mail in the message/partial format described in the 12th line of FIG. 5 (step S506). And if there is a description of message/partial, the CPU 130 determines that the e-mail is the split e-mails.

If determined to be the split e-mails in the step S506 (Yes), the CPU 130 stores the split e-mails in the divided reception box (step S507). If determined not to be the split e-mails (No), the CPU 130 transits to an image information extraction process of a step S510.

If the split e-mails is stored in the divided reception box in the step S507, it is examined whether or not all the pieces of the split e-mails are gathered. by being stored (step S508). Consequently, if all the pieces of the split e-mails are not gathered (No), the flowchart shown in FIG. 11 is used to perform the process for the case where all the pieces of the split e-mails are not gathered (step S521).

If determined that all the pieces of the split e-mails are gathered in the step S508 (Yes), the MFP 100 cuts the data from each piece of the split e-mails in the order of the division numbers. And the data is put together by combining the cut pieces of the data in order (step S509) so as to move on to the step S510.

In the step S510, the image information extraction process is similarly performed from the e-mail combined in the step S509 or received undivided ordinary mail. In this embodiment, the e-mail BASE64-encoded or uuencoded is decoded to convert it to the TIFF file in advance so as to extract the image data from the converted TIFF file. In the case where the text data exists in the e-mail, the text information is rasterized to become the image data.

After the image data is extracted in the step S510, it is determined whether or not the source of the e-mail is making an MDN (Mail Delivery Notification) request (step S511). Consequently, in the case of making the mail delivery notification request (Yes), a reply of OK to the mail delivery notification request (MDN request) is transmitted (step S512). In the case of making no MDN request (No) or in the case of having transmitted OK in the step S512, OK is recorded in a reception log (step S513).

The network system according to this embodiment has a transfer function whereby, in the case where the values of To, From and Subject of the received e-mail are predetermined values, the image data is transferred to these addresses (including a system box). Therefore, transfer conditions for performing the transfer function are searched for and obtained-(step S514). And a comparison is made between the obtained transfer information and the values of the To, From and Subject fields set in header fields of the e-mail (step S515). Consequently, in the case where the values of the To, From and Subject fields match with the transfer conditions (Yes), a data transfer process is performed (step S516).

In the case where the values of the To, From and Subject fields do not match with the transfer conditions in the step S515 (No), it is determined whether or not to perform a system box storage process (step S517). In the step S517, in the case where a transfer address is set to the system box or in the case where printing cannot be performed for the reasons such as having no printing paper in the printer 135, system box storage is selected (Yes) and the system box storage process is performed (step S518). It moves on to the process of a step S520 after the system box storage process is performed. In the case where the system box storage is not performed (No), the printing process of the image having the mail text rasterized and the image extracted from the attached TIFF file is performed (step S519) so as to move on to the process of a step S520.

In the step S520, the processing is finished by permitting the MFP 100 to shift to the standby state (that is, the SLEEP state) by means of the power control circuit 141. If the shift to the SLEEP state is permitted, the power control circuit 141 is put in a power saving state which is the aforementioned SLEEP 1 or SLEEP 2 state according to the state of temperature of the printer and the like and the state of the other circuits.

FIG. 11 is a flowchart for describing details of the processing in the case where all the pieces of the split e-mails are not gathered in the divided reception box of the flowchart shown in FIG. 10 (step S521). First, it is determined whether or not the predetermined time has elapsed after receiving previous split e-mails or after transmitting the retransmission request mail (step S601). Consequently, in the case where the predetermined time has not elapsed (No), reception standby for the aforementioned SMTP reception (step S500) or POP reception (step S503.) is performed.

In the case where the predetermined time has elapsed (Yes), it is determined whether or not the retransmission request mail has been transmitted (step S602). Consequently, in the case where the retransmission request mail has not been transmitted (Yes), the division numbers of the split e-mails of the same division ID yet to be obtained (to-arrive numbers) are searched for (step S603). And the retransmission request mail of the split e-mails yet to be obtained is created and transmitted to the source (step S604) so as to perform the aforementioned reception standby.

In the case where the retransmission request mail has been transmitted in the step S602 (No), a search is made for the ID of the same split e-mails as that of the split e-mails of which predetermined time has elapsed (step S605). And it is determined whether or not the leading piece of the mail of number=1 of the 12th line shown in FIG. 5 exists in the split e-mails of the same division ID which was searched for and obtained (step S606).

Consequently, in the case where it is determined that no leading piece of the mail exists (No), mail header information storing sender information on the received split e-mails of which number is other than 1 is extracted (step S607). Next, character string data is rasterized to the image by using font data specified as the image data (step S608) so as to move on to a step S614.

In the case where it is determined that the leading piece of the mail exists in the step S606 (Yes), the same split e-mails are arranged in the order of number of the 12th line shown in FIG. 5 so as to perform the process of combining the numbers in order from 1 to an existing number (step S609). This process restores the mail data as shown in FIG. 6. However, an unreachable portion cannot be restored.

For instance, in the case where only the [5/5] mail piece 864 is unreachable in FIG. 6, it is possible to synthesize the mail text and the data from the first page to the seventh page. It is impossible, however, to synthesize the image of the eighth page.

Consideration is given to the case where the [⅕] mail piece 860 to [⅗] mail piece 862 have been received but the [⅘] mail piece 863 has not been received. In this case, it is possible to synthesize the mail text and the images from the first page to the fifth page. It is impossible, however, to synthesize the images of the sixth page to the eighth page.

Furthermore, in the case where the [⅕] mail piece 860 to [⅖] mail piece 861 have been received but the [⅗] mail piece 862 has not been received, it is possible to synthesize the mail text and the images from the first page to the third page. It is impossible, however, to synthesize the images of the fourth page to the eighth page.

Furthermore, in the case where the [⅕] mail piece 860 has been received but the [⅖] mail piece 861 has not been received, it is possible to synthesize the mail text and the image of the first page. It is impossible, however, to synthesize the images of the second page to the eighth page.

Furthermore, in the case where the [⅕] mail piece 860 cannot be received, it is not possible to synthesize all the information and images. Even in this case, however, the mail header information of the [⅖] mail piece 861 to [5/5] mail piece 864 includes the information such as the sender information, Subject, transmission time and the like. Therefore, it is possible to print such information. Thus, there is a merit that, even in the case where the image cannot be printed, it is possible to specify the sender and request the sender to retransmit it.

Of the mail having combined the split e-mails in the step S609, the mail header corresponding to the portion of the 15th line to 25th line shown in FIG. 5 and the character string data on the mail text of the 30th line to 31st line are obtained (step S610). And the character string data is rasterized to the image by using the font data specified as the image data (step S611) so as to move on to a step S612.

In the step S612, it is determined whether or not the image data of reference numerals 852 to 859 shown in FIG. 6 exists. Consequently, in the case where the image data exists (Yes), the image information extraction process is performed (step S613) so as to move on to the step S614. In the step S613, the image data of the BASE64-encoded or uuencoded portions of the synthesized image portions indicated by the reference numerals 852 to 859 of FIG. 6 is decoded and converted to the TIFF file. In the case where the created TIFF file is in a multi-page format, it is converted to a single-page TIFF file. In this case, halfway page data is deleted to interrupt the conversion process. It is possible, even if the last piece of the halfway page data is the data having run out halfway through a page such as MH, MR or MMR, to handle the portion holding as one line of the image as the image data and delete the image less than one line.

In the step S614, it is determined whether or not the source of the e-mail is making an MDN request. Consequently, in the case of making an MDN request (Yes), an NG is transmitted (step S615). The NG is transmitted by notifying the source (ifax@copy1.xyz.co.jp) by the e-mail including the mail text to the effect that a transmission error has occurred. It is also feasible, by the e-mail, to further notify the source of the information for identifying the mail pieces yet to arrive out of the split e-mails. The source (ifax@copy1.xyz.co.jp) is notified of the information for identifying the mail pieces yet to arrive. Thus, the source is notified that at least a part of the e-mail as the original of the multiple split e-mails has been transmitted to a recipient (ifax@abc.co.jp). In the case of making no MDN request (No) or in the case where the NG is transmitted in the step S615, the NG is recorded in the reception log (step S616).

Next, a comparison is made between the obtained transfer conditions and the values of the To, From and Subject fields set in header fields of the e-mail (step S617). Consequently, in the case where the values of the To, From and Subject fields match with the transfer conditions (Yes), the data transfer process is performed (step S618).

In the case where the values of the To, From and Subject fields do not match with the transfer conditions (No) in the step S617, it is determined whether or not to perform the system box storage process (step S619). In the step S619, in the case where the transfer address is set to the system box or in the case where the printing cannot be performed for the reason such as having no printing paper in the printer 135, the system box storage is selected (Yes) and the system box storage process is performed (step S620). It moves on to the process of a step S622 after the system box storage process is performed. In the case where the system box storage is not performed (No), the printing process of the image having the mail text rasterized and the image extracted from the attached TIFF file is performed (step S621) so as to move on to the process of the step S622.

The step S622 is finished by deleting the mail pieces of the same division ID. According to this embodiment, the e-mail reception method is described by using the SMTP and POP reception. However, it may also be the method of receiving the e-mail by using the protocol such as IMAP.

According to the above-mentioned embodiment, in the case where the ordinary e-mail includes a transmittal confirmation request, transmittal confirmation mail is sent back according to the reception thereof. As for the split e-mails, the transmittal confirmation mail is not transmitted immediately upon receiving each piece thereof but is only transmitted when two split e-malls are gathered. For instance, the transmittal confirmation mail stating that it is normal is sent in the case where all the split e-mails are gathered, and the one stating that it is not normal is sent in the case where only some of them are gathered.

Here, in the case of synthesizing the split e-mails in the process (the step S509 of FIG. 10 for instance), it is possible, as previously described, to have a format sentence of the MDN request entered in all the multiple split e-mails. Here, the format sentence of the MDN request is Disposition-Notification-To of the 10th line of FIG. 5 for instance.

It is also possible, for instance, to enter the format sentence of the MDN request in head data of the mail before the division without entering it in each piece of the head data of the split e-mails.

FIG. 12 is a diagram showing an example of the split e-mails data in which the format sentence of the MDN request is entered in the head data of the mail before division. It is possible to confirm that the MDN request was made to the mail only after synthesizing the split e-mails by using the split e-mail data shown in FIG. 12 rather than the split e-mail data shown in FIG. 5. The procedure in this case is similar to the flowcharts shown in the aforementioned FIGS. 10 and 11, wherein, as a difference, it can be determined whether or not there is the MDN request per step S511 only after data synthesis of the step S509.

Therefore., in the case of receiving the split e-mails having electronic data including request to send (RTS) information for transmitting the e-mail to a predetermined destination divided into a plurality, it is possible to synthesize the multiple split e-mails and adequately perform the transmittal confirmation indicating that at least a part of the electronic data has been transmitted.

In FIG. 5, a Disposition-Notification-To sentence indicating the transmittal confirmation request (MDN request) is entered in the header of each of the multiple split e-mails. In FIG. 12, the sentence indicating the transmittal confirmation request (MDN request) is entered in the header of the mail before the division. At the same time, there is also a conceivable aspect in which the sentence indicating the transmittal confirmation request (MDN request) is entered in the header of each of the multiple split e-mails while the sentence indicating the transmittal confirmation request (MDN request) is entered in the header of the mail before the division. The procedure in this aspect is the same as the flowcharts shown in the aforementioned FIGS. 10 and 11. To be more specific, it should be determined whether or not there is the MDN request per step S511 by checking that the sentence indicating the transmittal confirmation request (MDN request) is included in the header of each of the split e-mails. It should also be determined whether or not there is the MDN request per step S511 by checking that the sentence indicating the transmittal confirmation request (MDN request) is entered in the header of the mail before the division.

The embodiment example was described in detail above. However, the present invention may also take an embodiment as a system, an apparatus, a method, a program, a storage medium (recording medium) or the like. To be more precise, it may be applied either to the system configured by multiple devices or to the apparatus consisting of one device. According to the embodiment, in the case where all the split e-mails are not gathered, the source is requested to retransmit the split e-mails yet to arrive (steps S602 to 604). However, it may also be the embodiment omitting this step. In this case, it is possible, even if there are the split e-mails yet to arrive, to perform the process promptly by synthesizing (combining) the split e-mails already received.

According to the embodiment, in the case where all the split e-mails are not gathered, the split e-mails are synthesized (combined) when the predetermined time elapses after receiving the previous mail or after transmitting the retransmission request mail. However, this may also be another aspect. For instance, it is also possible to provide a key for giving an instruction to synthesize the split e-mails in the operating portion 133 and synthesize (combine) the split e-mails according to the instruction to synthesize them given by pushing the key before receiving all the split e-mails.

According to the embodiment, in the case where there is the transmittal confirmation request (MDN request) in the e-mail, the reception of the e-mail is confirmed in the stage where the e-mail is received. However, this may also be another aspect. For instance, in the case of IFAX, it is assumed that the e-mail is printed (image-formed) by the printer 135. Thus, it is possible confirm that the e-mail has been received by completion of the printing of the image data relating to the e-mail by the printer 135 (for instance, the recording paper having the developer corresponding to the image data fixed thereon is ejected to the catch tray 371). In this case, the step S512 of FIG. 10 is performed after the step S519, and the step S615 of FIG. 11 is performed after the S621.

The present invention may also supply a software program for implementing the functions of the aforementioned embodiment (the program corresponding to the flowcharts shown in the drawings in the embodiment) to the system or the apparatus directly or remotely. In this case, the computer of the system or the apparatus reads and executes a supplied program code so as to achieve the functions of the embodiment.

Therefore, the present invention is also realized by the program code itself installed on the computer for the sake of implementing functional processing of the present invention on the computer. To be more specific, the present invention also includes the computer program itself for implementing functional processing of the present invention.

In that case, if it has the functions of the program, it may be in the form of object code, a program executed by an interpreter, script data supplied to an OS or the like.

The recording medium for supplying the program may be a floppy (registered trademark) disk, a hard disk, an optical disk, a magnetic optical disk, an MO, a CD-ROM, a CD-R, a CD-RW or the like for instance. It may also be a magnetic tape, a nonvolatile memory card, an ROM, a DVD (DVD-ROM, DVD-R) or the like.

As for the method of supplying the program, it is possible to connect to a home page on the Internet by using a browser of a client computer and download the computer program itself of the present invention from the home page so as to supply the program. It is may also be supplied by downloading a file including an automatic install function of the computer program of the present invention onto the recording medium such as the hard disk. It is also implementable by dividing the program code configuring the program of the present invention into multiple files and downloading the respective files from different home pages. To be more specific, the present invention also includes a WWW server for downloading to multiple users the program files for implementing the functional processing of the present invention on the computer.

It is also possible to encrypt the program of the present invention, store it in the storage medium such as the CD-ROM and distribute it to the users so as to allow the user having cleared predetermined conditions to download key information for breaking the encryption from the home page via the Internet. In this case, it is possible to have the encrypted program executed by using the key information and installed on the computer so as to implement the functions of the present invention.

The functions of the aforementioned embodiment are implemented by having the read program executed by the computer. In addition, the OS and the like operating on the computer perform a part or all of actual processing based on the instructions of the program, and so the functions of the aforementioned embodiment are implementable by that processing.

Furthermore, the program read from the recording medium is written to a memory provided to an expansion board inserted into the computer or an expansion unit connected to the computer. Thereafter, the CPU or the like provided to the expansion board or the expansion unit performs a part or all of the actual processing based on the instructions of the program so that the functions of the aforementioned embodiment are also implemented by that processing.

According to the present invention, in the case of receiving the e-mail which is the split e-mails including the request-to-send (RTS) information for transmitting the e-mail to a predetermined destination, it is possible to suitably perform the transmittal confirmation without transmitting to the source the e-mail of the transmittal confirmation as to each of the multiple pieces of the split e-mails.

According to the present invention, in the case of receiving the split e-mails having the electronic data including the request-to-send (RTS) information for transmitting the e-mail to a predetermined destination divided into multiple pieces, it is possible to synthesize the multiple split e-mails and adequately perform the transmittal confirmation indicating that at least a part of the electronic data has been transmitted.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-073960 filed Mar. 15, 2005, which is hereby incorporated by reference herein in its entirety.

What is claimed is:

1. An e-mail communication apparatus comprising:
a central processing unit (CPU) and memory device;
a receiving unit adapted to receive plurality of multiple split e-mails which are generated by dividing an e-mail to which an image file is attached in specific units;
a combining unit adapted to generate combined data based on said multiple split e-mails received by said receiving unit in the case where one of the received split e-mails includes a leading piece of the e-mail, wherein said combining unit does not generate the combined data in the case where none of the received split emails includes the leading piece of the e-mail; and
a transmitting unit adapted to, in the case where each of said received split e-mails includes disposition-notification information, transmit to a destination a disposition-notification e-mail for said received split e-mails,
wherein said transmitting unit transmits a first disposition-notification e-mail which indicates all of said multiple split e-mails generated from the e-mail are received by said receiving unit to the destination in a case where all of said multiple split e- mails generated from the e-mail are received by said receiving unit, and transmits a second disposition-notification e-mail which indicates at least one of all of said multiple split e-mails generated from the e-mail is/are not received by said receiving unit to said destination in a case where at least one of all of said split e-mails generated from the e-mail is/are not received by said receiving unit.

2. The e-mail communication apparatus according to claim 1, wherein:
said combining unit combines the multiple split e-mails according to reception by the receiving unit of all said multiple split e-mails relating to the e-mail.

3. The e-mail communication apparatus according to claim 1, wherein:
said combining unit combines the multiple split e-mails according to an instruction given from an operator of the e-mail communication apparatus before the reception by the receiving unit of all of the multiple split e-mails relating to the e-mail.

4. The e-mail communication apparatus according to claim 1, further comprising:
a timing unit adapted to time an elapsed time from the reception by said receiving unit of at least one of the multiple split e-mails relating to the e-mail, and wherein:
the combining unit generates said combined data based on the multiple split e-mails according to timing by the timing unit of predetermined elapsed time before the reception by said receiving unit of all of the multiple split e-mails relating to the e-mail.

5. The e-mail communication apparatus according to claims 1, further comprising:
requesting unit adapted to request a source of the split e-mails to retransmit the split e-mails yet to be received in the case where, after the reception by said receiving unit of at least one of the split e-mails relating to the e-mail, the reception of all the multiple split e-mails relating to the e-mail is not completed.

6. The e-mail communication apparatus according to claim 1, further comprising:
an image forming unit adapted to form an image on recording paper based on said combined data.

7. The e-mail communication apparatus according to claim 6, wherein
said transmitting unit transmits said first disposition-notification email or said second disposition-notification e-mail after completion of image formation by said image forming unit of said combined data.

8. The e-mail communication apparatus according to claim 1, wherein:
said destination is the source of the split e-mails received by said receiving unit.

9. The e-mail communication apparatus according to claim 1, wherein:
the split e-mail is one of divided data pieces generated by dividing the e-mail by a predetermined data amount.

10. An e-mail communication method comprising:
a receiving step of receiving multiple split e-mails which are generated by dividing an e-mail to which an image file is attached in specific units;
a combining step of generating combined data based on said multiple split e-mails received in said receiving step in the case where one of the received split e-mails includes a leading piece of the e-mail, wherein said combining step does not generate combined data in the case where none of the received split emails includes the leading piece of the e-mail; and a transmitting step of, in the case where each of said received split e-mails includes disposition-notification information, transmit to a destination a disposition-notification e-mail for said received split e-mails, wherein said transmitting step transmits a first disposition-notification e-mail which indicates all of said multiple split e-mails generated from the e-mail are received by said receiving step to the destination in a case where all of said multiple split e-mails generated from the e-mail are received by said receiving step, and transmits a second disposition-notification e-mail which indicates at least one of all of said multiple split e-mails generated from the e-mail is/are not received by said receiving step to said destination in a case where at least one of all of said multiple split e-mails generated from the e-mail is/are not received by said receiving step.

11. A computer-readable storage medium on which is stored a computer executable program that, when executed by a computer, performs the method according to claim 10.

* * * * *